US008877382B2

(12) United States Patent
Kim et al.

(10) Patent No.: US 8,877,382 B2
(45) Date of Patent: Nov. 4, 2014

(54) METHOD FOR MANUFACTURING POSITIVE ACTIVE MATERIAL FOR RECHARGEABLE LITHIUM BATTERY AND RECHARGEABLE LITHIUM BATTERY USING SAME

(75) Inventors: Min-Han Kim, Yongin-si (KR); Do-Hyung Park, Yongin-si (KR); Seon-Young Kwon, Yongin-si (KR); Yu-Mi Song, Yongin-si (KR); Ji-Hyun Kim, Yongin-si (KR); Kyoung-Hyun Kim, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 445 days.

(21) Appl. No.: 13/114,949

(22) Filed: May 24, 2011

(65) Prior Publication Data

US 2011/0305937 A1  Dec. 15, 2011

(30) Foreign Application Priority Data

Jun. 13, 2010 (KR) .................. 10-2010-0055745

(51) Int. Cl.
*H01M 4/1391* (2010.01)
*H01M 4/131* (2010.01)
(Continued)

(52) U.S. Cl.
CPC .............. *H01M 4/485* (2013.01); *H01M 4/525* (2013.01); *H01M 2004/021* (2013.01); *Y02E 60/122* (2013.01); *H01M 4/505* (2013.01); *H01M 2/1653* (2013.01); *H01M 4/1391* (2013.01)
USPC ...................... 429/231.3; 429/231.1; 429/233; 429/244; 423/179.5; 423/594.4; 423/594.6; 423/599; 423/594.15

(58) Field of Classification Search
USPC ............... 423/179.5, 593.1, 594.15; 429/223, 429/224, 231.1, 231.3
See application file for complete search history.

(56) References Cited

U.S. PATENT DOCUMENTS 5,939,043 A * 8/1999 Yahagi ........................ 429/224
7,049,028 B2 * 5/2006 Notten et al. ................. 429/163
(Continued)

FOREIGN PATENT DOCUMENTS

CN  002514345 Y  10/2002
CN  1450676 A  10/2006
(Continued)

OTHER PUBLICATIONS

N.V. Kosova et al. "Effects of electronic state of ions on the electrochemical properties of layered cathode materials LiNi1-2xCoxMnxO2." Russian Journal of Electrochemistry. vol. 44, No. 5 (2008).

(Continued)

*Primary Examiner* — Maria J Laios
*Assistant Examiner* — Robert S Carrico
(74) *Attorney, Agent, or Firm* — Robert E. Bushnell, Esq.

(57) ABSTRACT

A method for preparing a positive active material for a rechargeable lithium battery includes: a) providing a furnace and a crucible that is included in the furnace; b) putting a mixture of a composite metal precursor and a lithium compound into the crucible; and c) preparing a positive active material for a rechargeable lithium battery by firing the mixture in the crucible, wherein during the process b), the mixture in the crucible is positioned so that a minimum distance from a predetermined position inside the mixture to an exterior of the mixture in the crucible is about 5 cm or less. A rechargeable lithium made by this method is disclosed.

13 Claims, 6 Drawing Sheets

(51) Int. Cl.
*C01D 15/02* (2006.01)
*C01D 1/02* (2006.01)
*C01G 45/12* (2006.01)
*H01M 4/525* (2010.01)
*H01M 4/505* (2010.01)
*H01M 2/16* (2006.01)
*H01M 4/485* (2010.01)
*H01M 4/02* (2006.01)

(56) References Cited

U.S. PATENT DOCUMENTS

| | | | |
|---|---|---|---|
| 7,211,237 B2 * | 5/2007 | Eberman et al. | 423/594.15 |
| 7,384,706 B2 | 6/2008 | Suhara et al. | |
| 7,488,465 B2 | 2/2009 | Eberman et al. | |
| 7,582,383 B2 | 9/2009 | Kasai et al. | |
| 8,303,927 B2 * | 11/2012 | Yura et al. | 423/594.15 |
| 2002/0086210 A1 * | 7/2002 | Naruoka et al. | 429/223 |
| 2005/0142440 A1 * | 6/2005 | Yamaki et al. | 429/209 |
| 2006/0257746 A1 * | 11/2006 | Inagaki et al. | 429/231.5 |
| 2010/0143802 A1 | 6/2010 | Takei | |

FOREIGN PATENT DOCUMENTS

| | | |
|---|---|---|
| CN | 101407873 A | 4/2009 |
| CN | 101497951 A | 8/2009 |
| JP | 2000-058053 | 2/2000 |
| JP | 2006-62911 A | 3/2006 |
| JP | 2007123255 A * | 5/2007 |
| JP | 2010-015959 | 1/2010 |
| KR | 10-2005-0121727 | 12/2005 |

OTHER PUBLICATIONS

Chinese Office Action issued on Jun. 21, 2013 by SIPO in the corresponding Chinese Patent Application No. 201110136307.0.
SIPO Office Action issued on Feb. 8, 2014 in connection with corresponding Chinese Patent Application Serial No. 201110136307.0.

* cited by examiner

METHOD FOR MANUFACTURING POSITIVE ACTIVE MATERIAL FOR RECHARGEABLE LITHIUM BATTERY AND RECHARGEABLE LITHIUM BATTERY USING SAME

CLAIM OF PRIORITY

This application makes reference to, incorporates the same herein, and claims all benefits accruing under 35 U.S.C. §119 from an application earlier filed in the Korean Intellectual Property Office on Jun. 13, 2010 and there duly assigned Serial No. 10-2010-0055745.

BACKGROUND OF THE INVENTION

1. Field of the Invention

One embodiment of the present invention relates to a method of preparing a positive active material for a rechargeable lithium battery, and a rechargeable lithium battery including the same.

2. Discussion of Related Art

Due to reductions in size and weight of portable electronic equipments, there has recently been a need to develop batteries used in the portable electronic equipments, and such batteries are required to have both high performance and large capacity.

Batteries generate electric power by using an electrochemical reaction material (referred to hereinafter simply as an "active material") to form a positive electrode and a negative electrode. Rechargeable lithium batteries generate electrical energy from changes of chemical potential during intercalation/deintercalation of lithium ions at the positive and negative electrodes.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides a method of preparing a positive active material that is economically effective, and has good stability, higher capacity, improved electrical conductivity, and higher rate characteristics.

According to one aspect of the present invention, a method of preparing a positive active material for a rechargeable lithium battery includes steps of a) providing a furnace and a crucible that is included in the furnace; b) putting a mixture of a composite metal precursor and a lithium compound into the crucible; and c) preparing a positive active material for a rechargeable lithium battery by firing the mixture in the crucible. During the process b), the mixture in the crucible is positioned so that a minimum distance from a predetermined position inside the mixture to an exterior of the mixture in the crucible is about 5 cm or less.

During the process b), the mixture in the crucible may have a height measured from the bottom of the crucible of about 5 cm or less.

During the process b), the mixture in the crucible may have a height measured from the bottom of the crucible of about 3 cm or less.

After the process b), grooves having a predetermined gap or depth are further formed in the mixture in the crucible.

The predetermined gap or depth is formed in the mixture in the crucible so that a minimum distance from a predetermined position inside the mixture to an exterior of the mixture, or from a predetermined position inside the mixture to the groove, may be within about 5 cm or less.

The positive active material for a rechargeable lithium battery may include lithium metal oxide represented by the following Chemical Formula 1.

$$Li_aMeO_2 \qquad \text{[Chemical Formula 1]}$$

In Chemical formula 1, Me is $Ni_xCo_yMn_zM'_k$, 0.45≤x≤0.65, 0.15≤y≤0.25, 0.15≤z≤0.35, 0.9≤a≤1.2, 0≤k≤0.1, x+y+z+k=1, and M' is Al, Mg, Ti, Zr, or a combination thereof.

In Chemical Formula 1, 0.55≤x≤0.65, 0.15≤y≤0.25, 0.15≤z≤0.25, 0≤k≤0.1, and x+y+z+k=1.

In Chemical Formula 1, y and z may be the same.

The composite metal precursor and the lithium compound of the process b) may be mixed so that lithium of the lithium, compound to the metal of the composite metal precursor may be present at a mole ratio of about 0.9 to about 1.2.

In one embodiment, the mole ratio of lithium of the lithium compound to the metal of the composite metal precursor may be about 0.97 to about 1.05.

The firing temperature of the process c) may range from about 800° C. or more to about 900° C. or less.

In one embodiment, the firing temperature of the process c) may range from about 850° C. to about 890° C.

The lithium compound may include lithium carbonate, lithium nitrate, lithium acetate, lithium hydroxide, lithium hydrate hydroxide, lithium oxide, or a combination thereof.

In the process c), air positioned on the upper side of the furnace may satisfy the following Equation 1.

$$x=\{\text{air influx per unit hour } (m^3/h)\}/\{\text{interior volume of a furnace } (m^3)\} \qquad \text{[Equation 1]}$$

In Equation 1, 1.0≤x≤100.0.

In another aspect of this disclosure, a rechargeable lithium battery is provided that includes a positive electrode, a negative electrode, and an electrolyte, wherein the positive electrode includes a current collector and a positive active material layer disposed on the current collector, and the positive active material layer includes a positive active material produced by the above method.

In another still aspect of this disclosure, a rechargeable lithium battery is provided that includes a positive electrode including a positive active material having a Raman Spectroscopy intensity ratio I(587)/I(567) of more than about 1.02; a negative electrode; and an electrolyte.

The Raman Spectroscopy intensity ratio I(587)/I(567) of the positive active material may be more than about 1.02 and about 1.08 or less.

The electrolyte may include a non-aqueous organic solvent and a lithium salt.

The rechargeable lithium battery may further include a separator.

The separator may be a single-layer or multi-layer separator selected from polyethylene, polypropylene, or polyvinylidene fluoride.

The positive active material is economically effective, has good stability, higher capacity, improved electrical conductivity, and higher rate characteristics.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Rechargeable lithium batteries use materials that reversibly intercalate or deintercalate lithium ions during charge and discharge reactions for both positive and negative active materials, and contain an organic electrolyte solution or a polymer electrolyte between the positive electrode and the negative electrode.

For positive active materials of a rechargeable lithium battery, lithium composite metal compounds have been used, and lithium composite metal oxides such as $LiCoO_2$, $LiMn_2O_4$, $LiNiO_2$, $LiNi_{1-x}Co_xO_2$ (0<x<1), $LiMnO_2$, or the like have been researched.

Among the positive active materials, manganese-based positive active materials such as $LiMn_2O_4$ or $LiMnO_2$ are the easiest to synthesize, are less costly than other materials, have excellent thermal stability in comparison with other active materials during overcharging, and are environmentally friendly.

These manganese-based materials however have relatively lower capacity.

Among the commercial positive active material, $LiCoO_2$ is outstanding because $LiCoO_2$ has better electrical conductivity, higher battery voltage of about 3.7V, excellent cycle-life characteristics, higher stability, and excellent discharge capacity. However, since $LiCoO_2$ is expensive and is responsible for 30% or more of the total cost of a battery, $LiCoO_2$ has disadvantages in terms of cost.

Also, $LiNiO_2$ has the highest discharge capacity battery characteristics among the mentioned positive active materials, but $LiNiO_2$ is difficult to synthesize. Further, high oxidation states of nickel may cause deterioration of the cycle-life of the battery and electrode, and may cause easy self-discharge and lower reversibility of the battery. Furthermore, a commercially available battery is different to fabricate because it is difficult to ensure the stability of the battery.

Embodiments of the present invention will hereinafter be described in detail. However, these embodiments are only exemplary, and the present invention is not limited thereto.

Figure 6:
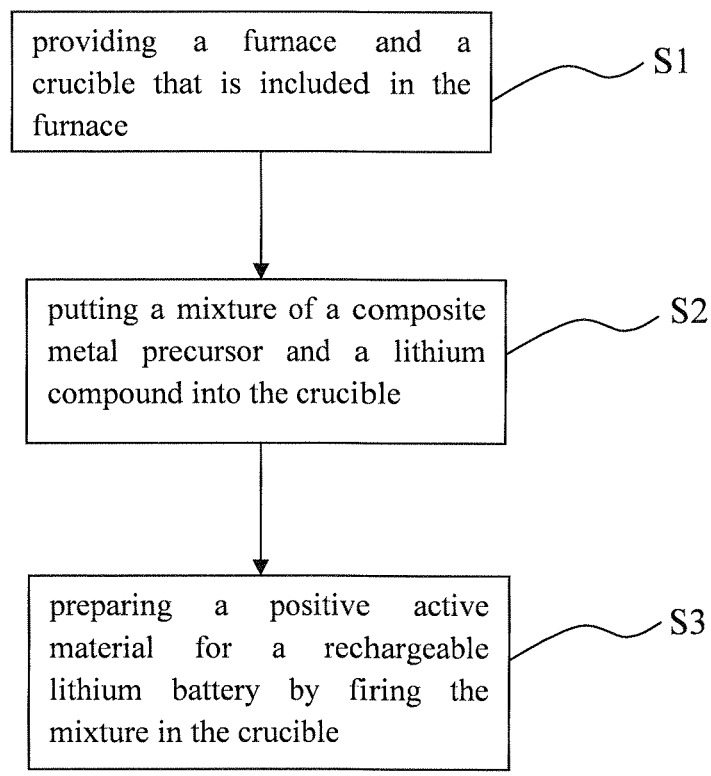
FIG. 6 is a flow chart showing a manufacturing process of a positive active material for a rechargeable lithium battery.

In one embodiment, as shown in FIG. 6, a method of preparing a positive active material for a rechargeable lithium battery is provided. The method includes steps of a) providing a furnace and a crucible that is included in the furnace (S1); b) putting a mixture of a composite metal precursor and a lithium compound into the crucible (S2); and c) preparing a positive active material for a rechargeable lithium battery by firing the mixture in the crucible (S3). During the process b), the mixture disposed in the crucible is positioned so that a minimum distance from a predetermined position inside the mixture to an exterior of the mixture disposed in the crucible is about 5 cm or less.

When the minimum distance from a predetermined position inside the mixture to an exterior of the mixture is within about 5 cm or less, carbon dioxide generated during the firing process may be effectively decreased. When the carbon dioxide remains in the mixture, a $Li_2CO_3$ type of byproduct may be produced through a reaction of the lithium compound included in the mixture and the carbon dioxide. The more Ni is concentrated in the composite metal precursor, the more serious the problem of producing the byproduct is.

The preparing method may further include a process of forming grooves on the mixture in the crucible at predetermined gaps or predetermined depths. Through the formed grooves, carbon dioxide produced during firing may be effectively removed.

Figure 1:
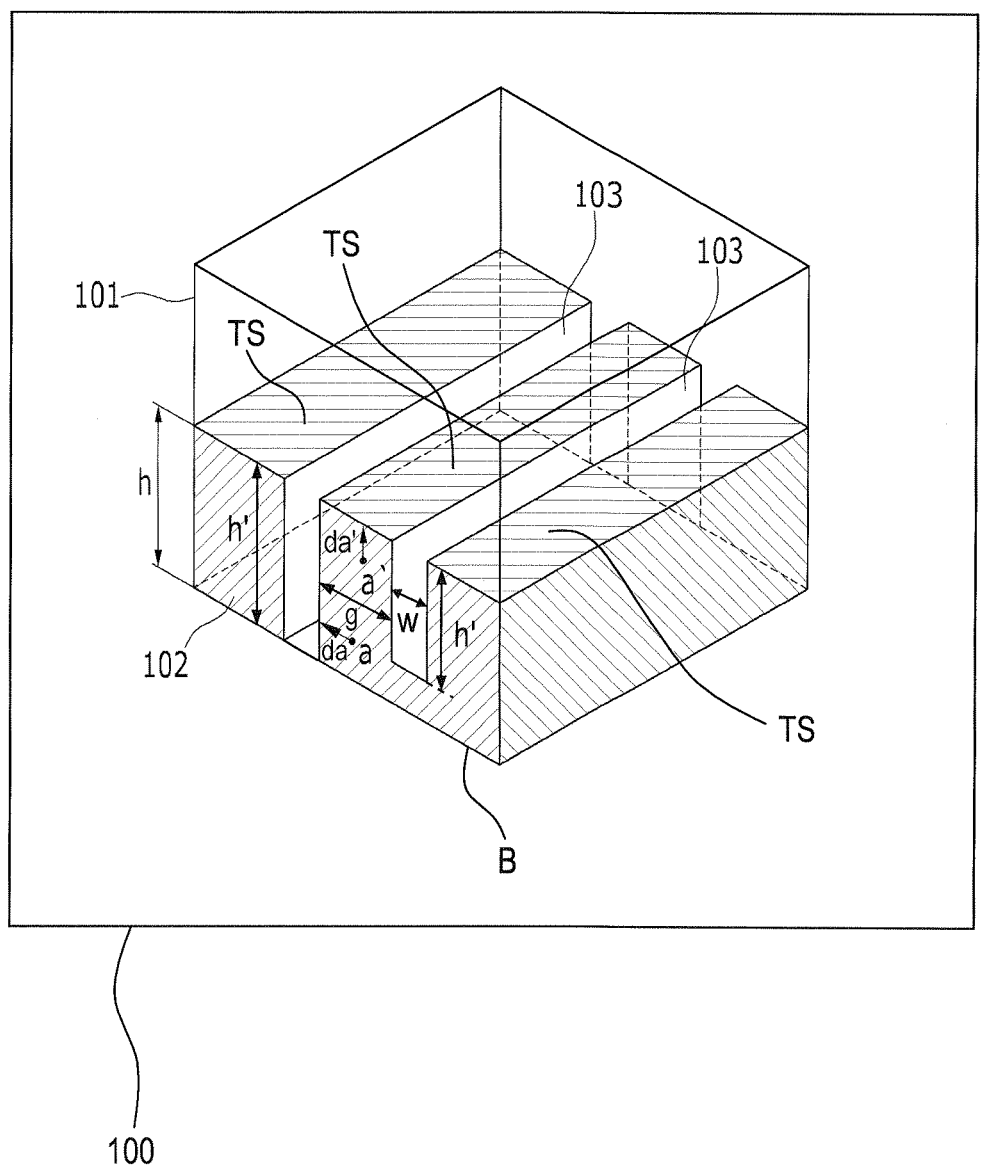
FIG. 1 is a schematic diagram showing a mixture 102 disposed in a crucible 101.

FIG. 1 shows a mixture 102 in a crucible 101. The crucible 101 is disposed within a furnace 100. In one embodiment, the mixture 102 may be in immediate contact with the bottom B of the crucible 101. The height of the mixture 102 is represented by h. In one embodiment, the height of the mixture 102 may be measured from the bottom B of the crucible 101. The mixture 102 may include a predetermined groove 103, and the groove may be present in plural. In one embodiment, the groove 103 may have same height in comparison with the height of the mixture 102. Further, the height h' and the width w of the groove 103 may be controlled as needed.

The groove 103 may have a height of about 1 to about 10 cm, and a width of about 0.1 to about 1 cm. Also, a gap g of about 1 cm to about 10 cm may be present between neighboring grooves 103, and may have a repeating period of about 1 to about 50.

As mentioned above, when the minimum distance from a predetermined position inside the mixture to an exterior of the mixture 102 is within about 5 cm or less, carbon dioxide produced while firing the mixture 102 may be effectively removed. If carbon dioxide is not effectively removed from the interior of the mixture 102, a lithium compound (e.g., $Li_2CO_3$) may not be sufficiently decomposed, and therefore a $Li_2CO_3$ type of byproduct may be produced through a reaction of lithium compound included in the mixture and the carbon dioxide. The more Ni is concentrated in the composite metal precursor, the more serious the problem of producing the byproduct is.

The groove 103 may be formed so that a minimum distance from a predetermined position inside the mixture 102 to an exterior of the mixture 102, or from a predetermined position inside the mixture 102 to the groove 103, may be within about 5 cm or less. In one embodiment, the minimum distance may be within about 3 cm or less.

Referring to FIG. 1, a and a' refer to two predetermined positions inside of the mixture 102. When one predetermined position is a, the minimum distance to the exterior of the mixture 102 is represented in FIG. 1. In other words, the minimum distance da may be a distance from position a to the side of the groove 103. When another predetermined position is a', the minimum distance da' to the exterior of the mixture 102 is a distance between position a' to the top surface TS of the mixture 102.

When the minimum distance from one predetermined position to the exterior of the mixture is within about 5 cm or less, carbon dioxide mentioned above is easily released. In one embodiment, the minimum distance may be within about 3 cm.

In one embodiment, at least one position disposed within the mixture 102 has a minimum distance to the surface of the mixture 102, and such minimum distance may be about 5 cm or less. In another embodiment, such minimum distance may be within about 3 cm.

In the process b), the mixture 102 in the crucible 101 may have a height (h) of about 5 cm or less. In one embodiment, the height (h) may be about 3 cm or less. When the minimum distance from one predetermined position to the exterior of the mixture 102 is within the range of about 5 cm or less, carbon dioxide produced during the firing process may be effectively removed. When the height h is about 5 cm, the minimum distance from one predetermined position to the exterior of the mixture 102 may be within about 5 cm or less.

The positive active material for a rechargeable lithium battery may include a lithium metal oxide represented by the following Chemical Formula 1.

$$Li_aMeO_2 \quad \text{[Chemical Formula 1]}$$

In Chemical Formula 1, Me is $Ni_xCo_yMn_zM'_k$, $0.45 \leq x \leq 0.65$, $0.15 \leq y \leq 0.25$, $0.15 \leq z \leq 0.35$, $0.9 \leq a \leq 1.2$, $0 \leq k \leq 0.1$, $x+y+z+k=1$, and M' may be Al, Mg, Ti, Zr, or a combination thereof.

In Chemical Formula 1, $0.55 \leq x \leq 0.65$, $0.15 \leq y \leq 0.25$, $0.15 \leq z \leq 0.25$, $0 \leq k \leq 0.1$, and $x+y+z+k=1$. Ni, Co, and Mn may be within a mole ratio of about Ni:Co:Mn=6:2:2. The mole ratio is out of the mole ratio of general tertiary positive active materials, and such mole ratio may improve battery characteristics such as battery capacity, voltage retention, cycle characteristics, or the like.

More particularly, in Chemical Formula 1, y and z may be the same. In other words, Co and Mn may have the same mole ratio. When the positive active material is included within the range mentioned above, battery capacity, cycle-life, stability, or the like may be improved.

The positive active material may be doped with Al, Mg, Ti, Zr, or a combination thereof by controlling the k value. The rechargeable lithium battery may have good high rate characteristics and initial capacity by controlling the doping within a suitable range.

When the positive active material having the composition of Chemical Formula 1 is less exposed to air (oxygen), unwanted phases may be produced resulting in bad effect in terms of battery capacity, while a general Co-based positive active material does not has such unwanted phases.

The composite metal precursor and the lithium compound of the process b) may be mixed so that lithium of the lithium compound to the metal of the composite metal precursor may have a mole ratio of about 0.9 to about 1.2. In one embodiment, the mole ratio may range from about 0.97 to about 1.05. When the mole ratio of lithium and the transition elements is within the range, battery capacity may be improved.

The firing temperature of the process c) may be between about 800° C. or more and less than about 900° C. In one embodiment, the firing temperature may be about 850° C. to about 890° C. The firing process may be performed by increasing a temperature at a temperature increase rate of about 0.5° C./min to about 20° C./min, to the above firing temperature. The temperature range may be lower than a general firing temperature range. When firing is performed within the range, the particle shape may be controlled as well as possible, and capacity may be maximized.

For example, in order to improve battery capacity characteristics, a Ni-based positive active material including 60 mol % or more of Ni based on 100 mol % of the total metals included in the precursor needs to be fired at less than about 900° C.

The lithium compound may include lithium carbonate, lithium nitrate, lithium acetate, lithium hydroxide, lithium hydroxide hydrate, lithium oxide, or a combination thereof, but is not limited thereto.

In the process c), air positioned on the upper side of the furnace may satisfy the following Equation 1.

$$x = \{\text{air influx per unit hour } (m^3/h)\}/\{\text{interior volume of a furnace } (m^3)\} \quad \text{[Equation 1]}$$

In Equation 1, $1.0 \leq x \leq 100.0$.

Herein, the air positioned on the upper part of the furnace may have momentum satisfying Equation 1. Therefore, carbon dioxide mentioned above may be easily removed.

In another embodiment, a rechargeable lithium battery may include a positive electrode, a negative electrode, and an electrolyte, wherein the positive electrode includes a current collector and a positive active material layer disposed on the current collector, and the positive active material layer includes the positive active material.

Since the positive active material is the same as the embodiment described above, the positive active material will not be described again hereafter.

In another embodiment, the positive active material has a Raman Spectroscopy intensity ratio of I(587)/I(567) of more than about 1.02. In another embodiment, the Raman Spectroscopy intensity ratio I(587)/I(567) may be more than about 1.02, and about 1.08 or less (that is, 1.02<Raman Spectroscopy intensity ratio I(587)/I(567)≤1.08). The Raman Spectroscopy intensity ratio is an intensity ratio of I(587) (a height of peak at about 587 $cm^{-1}$) to I(567) (a height of peak at about 567 $cm^{-1}$)

The positive active material layer may include a binder and a conductive material.

The binder improves binding properties of the positive active material particles to each other and to a current collector. Examples of the binder include at least one selected from the group consisting of polyvinyl alcohol, carboxylmethyl cellulose, hydroxypropyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

The conductive material is included to improve electrode conductivity. Any electrically conductive material may be used as a conductive material unless it causes a chemical change. Examples of the conductive material include: a carbon-based material such as natural graphite, artificial graphite, carbon black, acetylene black, ketjen black, a carbon fiber, and the like; a metal-based material such as a metal powder or a metal fiber including copper, nickel, aluminum, silver, and the like; a conductive polymer such as a polyphenylene derivative; or mixtures thereof.

The negative electrode includes a current collector and a negative active material layer disposed thereon, and the negative active material layer includes a negative active material.

The negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbon material. The carbon material may be any generally-used carbon-based negative active material for a lithium ion rechargeable battery. Examples of the carbon material include crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, mesophase pitch carbide, fired coke, or the like.

Examples of the lithium metal alloy includes lithium and a metal selected from Na, K, Rb, Cs, Fr, Be, Mg, Ca, Sr, Si, Sb, Pb, In, Zn, Ba, Ra, Ge, Al, or Sn.

Examples of the material being capable of doping and dedoping lithium include Si, SiO, (0<x<2), a Si-Q alloy (where Q is an element selected from the group consisting of an alkaline metal, an alkaline-earth metal, a group 13 element, a group 14 element, a transition element, a rare earth element, and combinations thereof, and is not Si), Sn, $SnO_2$, a Sn-Q alloy (where Q is an element selected from the group consisting of an alkaline metal, an alkaline-earth metal, a group 13 element, a group 14 element, a transition element, a rare earth element, and combinations thereof, and is not Sn), and mixtures thereof. At least one of these materials may be mixed with $SiO_2$. The element Q is selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, or the like.

The negative active material layer includes a binder and optionally a conductive material.

The binder improves binding properties of the negative active material particles to each other and to a current collector, and includes polyvinyl alcohol, carboxylmethyl cellulose, hydroxypropyl cellulose, polyvinylchloride, carboxylated polyvinylchloride, polyvinylfluoride, polyethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, or nylon, but is not limited thereto.

The conductive material is included to improve electrode conductivity. Any electrically conductive material may be used as a conductive material unless it causes a chemical change. Examples of the conductive material include: carbon-based materials such as natural graphite, artificial graphite, carbon black, acetylene black, ketjen black, carbon fiber, and the like; metal-based materials including a metal powder or a metal fiber of copper, nickel, aluminum, silver, and the like; conductive polymers of polyphenylene derivatives; or mixtures thereof.

The current collector may be selected from a copper foil, a nickel foil, a stainless steel foil, a titanium foil, a nickel foam, a copper foam, a polymer substrate coated with a conductive metal, or a combination thereof.

The current collector may include Al, but is not limited thereto.

The negative electrode and the positive electrode may be fabricated by mixing a negative active material, a conductive material, and a binder in a solvent in order to prepare an active material composition, and coating the active material composition onto a current collector. The electrode manufacturing method is well known, and thus is not described in detail in the present specification. The solvent may include N-methylpyrrolidone, or the like, but is not limited thereto.

The electrolyte may include a non-aqueous organic solvent and a lithium salt.

The non-aqueous organic solvent plays a role of transferring ions that are related to an electrochemical reaction of a battery.

The non-aqueous organic solvent may include carbonate-based, ester-based, ether-based, ketone-based, alcohol-based, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and examples of the ester-based solvent include methyl acetate, ethyl acetate, n-propyl acetate, dimethyl acetate, methylpropionate, ethylpropionate, γ-butyrolactone, decanolide, valerolactone, mevalonolactone, caprolactone, or the like. Examples of the ether-based solvent may include dibutyl ether, tetraglyme, diglyme, dimethoxyethane, 2-methyltetrahydrofuran, tetrahydrofuran, or the like, and examples of the ketone-based solvent may include cyclohexanone or the like. Examples of the alcohol-based solvent may include ethanol, isopropyl alcohol, and so on, and examples of the aprotic solvent may include R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or as a mixture. When the organic solvent is used as a mixture, the mixture ratio may be controlled in accordance with desirable battery performance.

The carbonate-based solvent may include a mixture of a cyclic carbonate and a linear carbonate. The cyclic carbonate and the chain carbonate are mixed together in a volume ratio of about 1:1 to about 1:9, and when this mixture is used as an electrolyte, the electrolyte performance may be enhanced.

In addition, the electrolyte of one embodiment may further include mixtures of carbonate-based solvents and aromatic hydrocarbon-based solvents. The carbonate-based solvents and the aromatic hydrocarbon-based solvents are mixed together in a volume ratio of about 1:1 to about 30:1.

The aromatic hydrocarbon-based organic solvent may be represented by the following Chemical Formula 2.

[Chemical Formula 2]

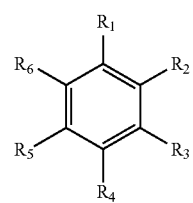

In Chemical Formula 2, $R_1$ to $R_6$ may be the same or different, and may be selected independently from hydrogen, a halogen, a C1 to C10 alkyl, a C1 to C10 haloalkyl, or a combination thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In order to improve a battery cycle-life, the non-aqueous electrolyte may further include vinylene carbonate or an ethylene carbonate-based compound of the following Chemical Formula 3.

[Chemical Formula 3]

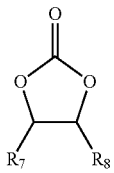

In Chemical Formula 3, $R_7$ and $R_8$ are the same or different, and may be selected independently from hydrogen, a halogen, a cyano group (CN), a nitro group ($NO_2$), or a C1 to C5 fluoroalkyl group, provided that at least one of $R_7$ and $R_8$ is halogen, a cyano group (CN), a nitro group ($NO_2$), or a C1 to C5 fluoroalkyl.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving cycle life may be adjusted within an appropriate range.

The lithium salt supplies lithium ions in the battery, and operates a basic operation of a rechargeable lithium battery and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, and $LiB(C_2O_4)_2$ (lithium bisoxalato borate, LiBOB). The lithium salt may be used at a concentration of about 0.1M (mol/L) to about 2.0M. When the lithium salt is included at the above concentration range, electrolyte performance and lithium ion mobility may be enhanced due to optimal electrolyte conductivity and viscosity.

The rechargeable lithium battery may further include a separator disposed between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. Structures and fabricating methods for lithium ion batteries pertaining to this disclosure are well known in the art.

Figure 5:
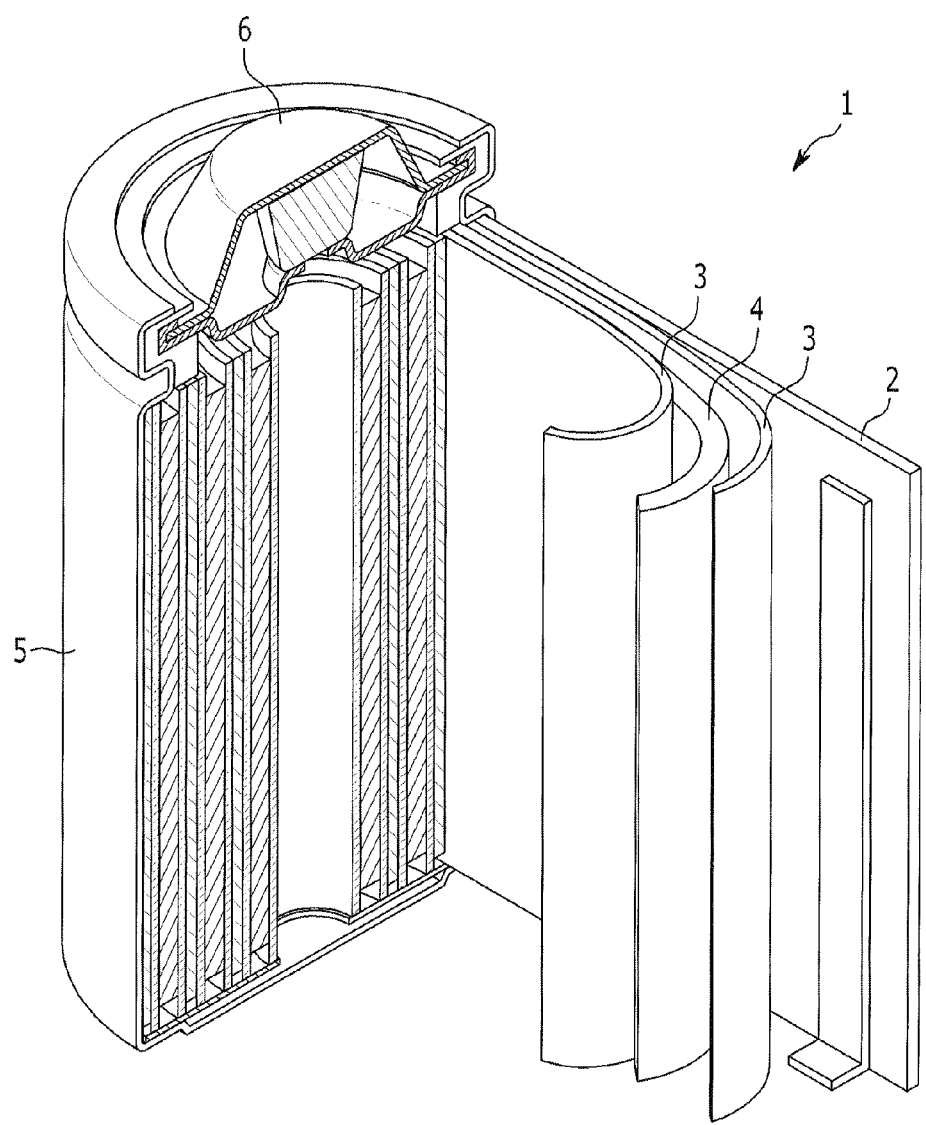
FIG. 5 is a schematic diagram of a rechargeable lithium battery according to one embodiment.

FIG. 5 is a schematic view of a representative structure of a rechargeable lithium battery. FIG. 5 illustrates a rechargeable lithium battery 1, which includes a positive electrode 4, a negative electrode 2, a battery case 5 including an electrolyte solution impregnating a separator 3 that is interposed between the positive electrode 4 and the negative electrode 2, and a sealing member 6 sealing the battery case 5.

The following examples illustrate the present invention in more detail. These examples, however, should not in any sense be interpreted as limiting the scope of the present invention.

EXAMPLES

Example 1

Preparation of Positive Active Material

About 25.1 g of $NiSO_4$, about 8.7 g of $CoSO_4$, and about 5.2 g of $MnSO_4$ were quantitatively mixed, and continually reacted in a co-precipitator.

The co-precipitation was reacted for 8 hours, while the reaction temperature was about 40° C. and the agitating speed was about 600 rpm.

The transition element precursor hydroxide produced by the reaction was collected and washed several times, and dried at about 120° C. in an oven. $Li_2CO_3$ was added to the dried transition element precursor hydroxide until the Li/transition element ratio reached about 1.03, and the mixture was mixed using a mixer.

The prepared mixture was put into a crucible in a furnace with a height of about 6 cm, and grooves having a width of about 0.5 cm, a height of about 3 cm, and gaps between the grooves of about 3 cm were formed. The mixture was heat-treated at an increasing rate of about 2° C./min, to a temperature of about 850° C., fired at a temperature of about 850° C. for about 10 hours, and cooled at a decreasing rate of about 2° C./min to prepare a positive active material.

Comparative Example 1

Preparation of Positive Active Material

A positive active material was prepared using the same method as in Example 1, except for putting a mixture in a crucible with a height of about 6 cm and without grooves.

Example 2

Preparation of Half-Cell

A positive electrode slurry was prepared by dispersing the positive active material of Example 1, a polyvinylidene fluoride binder, and a carbon conductive agent at a weight ratio of about 96:about 2:about 2 in an N-methylpyrrolidone solvent. A positive electrode was prepared by coating the positive electrode slurry on an aluminum foil with a thickness of about 60 μm to form a thin electrode plate, drying at about 135° C. for about 3 hours or more, and compressing the thin electrode plate.

A half-cell was fabricated by using the positive electrode, a lithium metal as a counter electrode, interposing a polyethylene separator between the positive electrode and the counter electrode, and injecting an electrolyte. As for the electrolyte, 1.3M of $LiPF_6$ dissolved in a mixed solvent of ethylene carbonate (EC), ethylmethyl carbonate (EMC), and dimethyl carbonate (DMC) at a 2:2:6 volume ratio was used.

Comparative Example 2

Preparation of Half-Cell

A half-cell was fabricated using the same method as in Example 2, except for using the positive active material of Comparative Example 1 instead of the positive active material of Example 1.

EXPERIMENTAL EXAMPLES

Scanning Electron Microscope (SEM)

Figure 2:
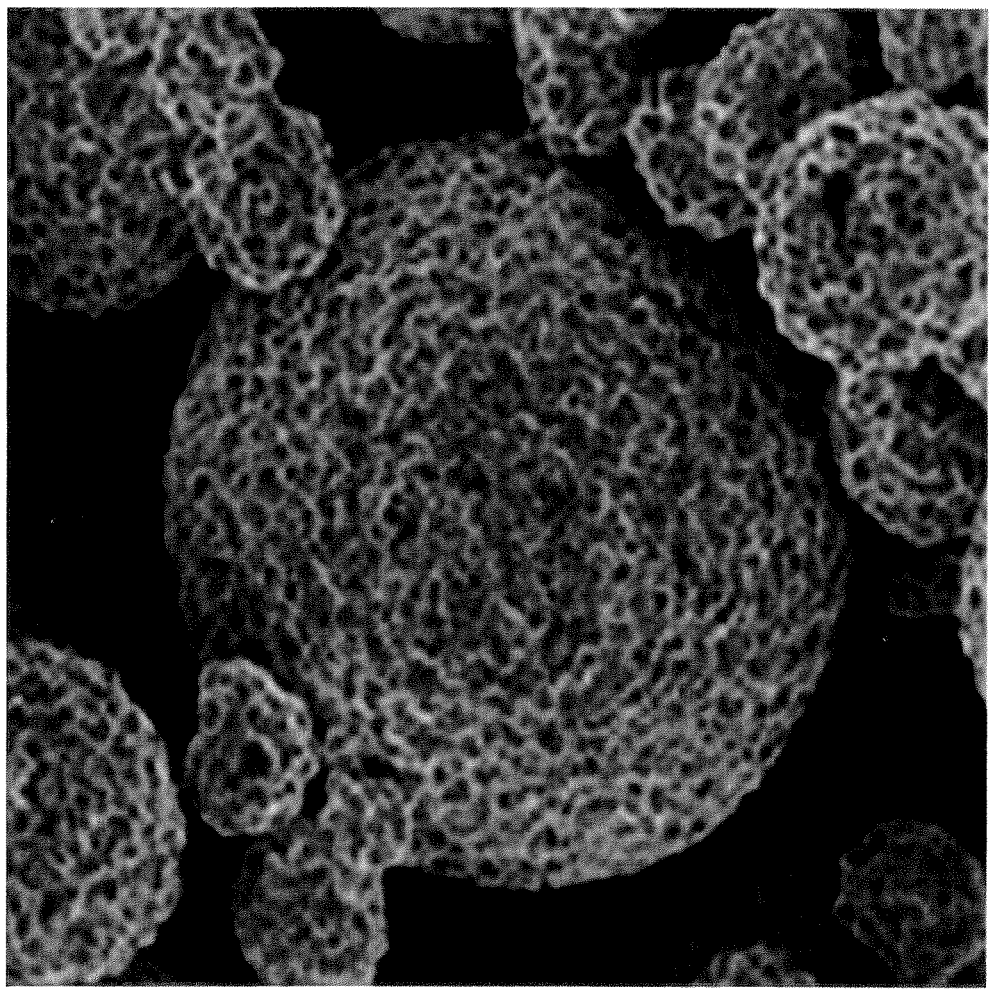
FIG. 2 is a SEM photograph showing a positive active material prepared according to Example 1.
Figure 3:
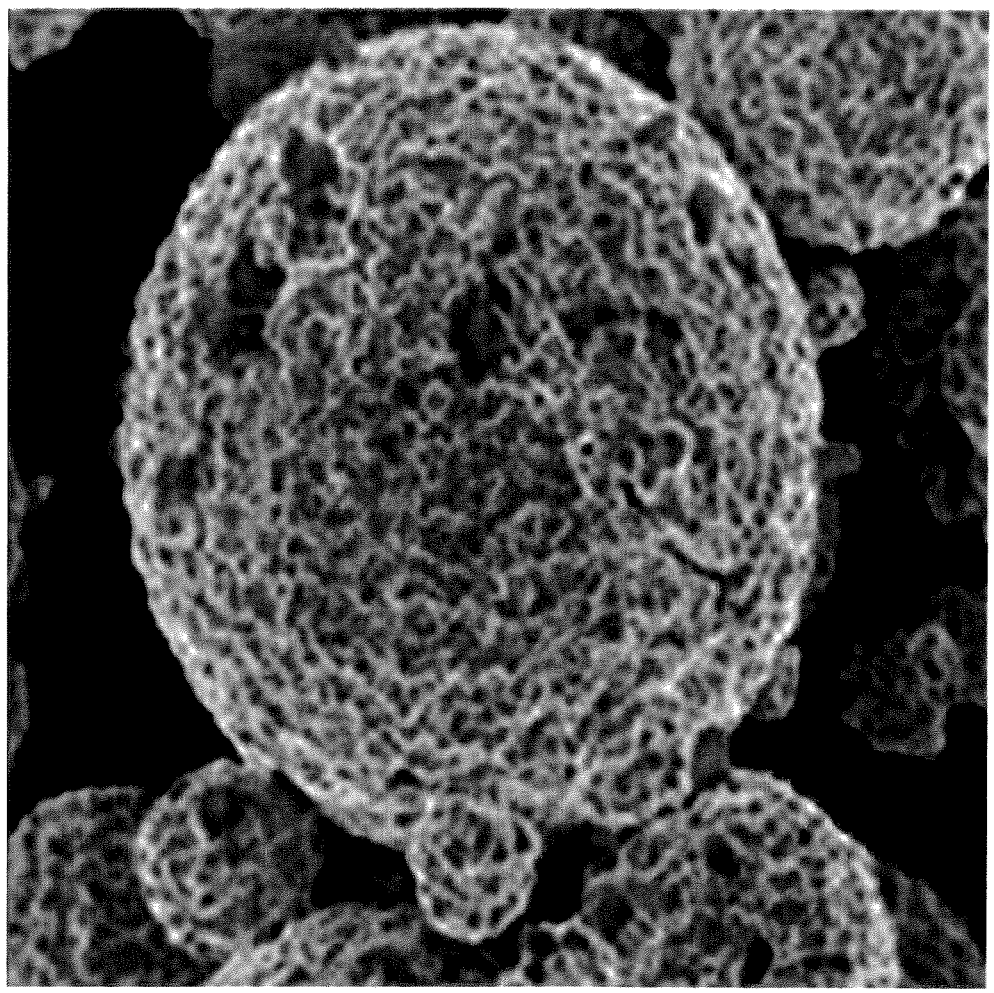
FIG. 3 is a SEM photograph of a positive active material prepared according to Comparative Example 1.

FIG. 2 is a scanning electron microscope (SEM) photograph of a positive active material prepared according to Example 1, and FIG. 3 is a SEM photograph of a positive active material prepared according to Comparative Example 1. FIGS. 2 and 3 are magnified by about 20,000 times.

As shown in FIGS. 2 and 3, in the positive active material according to Comparative Example 1 in which no groove was formed, $Li_2CO_3$ and additional Li-based compounds remain on the surface of a particle because carbon dioxide of $Li_2CO_3$ is hard to be decomposed smoothly. On the contrary, the positive active material of Example 1 has a more uniform surface in comparison with the Comparative Example 1.

Therefore, the positive active material of Example 1 may form a uniform $LiNi_xCo_yMn_xO_2$ phase, and thereby may provide excellent battery characteristics.

Raman Analysis

Raman analysis was performed under the condition as follows.

Analysis condition: $Ar^+$ laser (514.5 nm), power=1 mW, time=300 s, magnification=50×.

Figure 4:
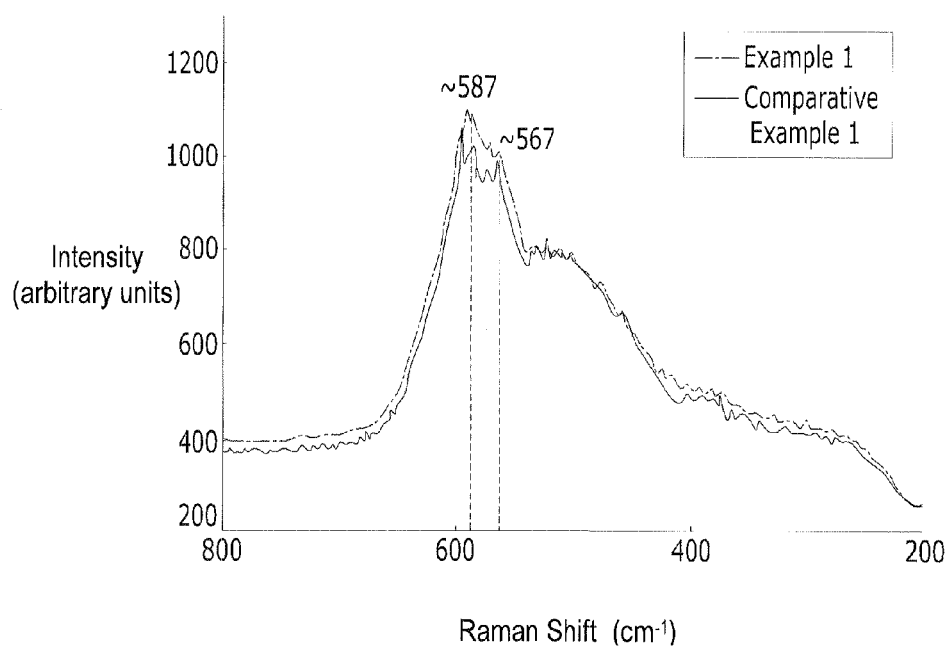
FIG. 4 is Raman analysis data of Example 1 and Comparative Example 1.

FIG. 4 shows the result of Raman analysis of Example 1 and Comparative Example 1.

Compared with Example 1, Comparative Example 1 showed a tendency of increasing peak intensity at about 567 $cm^{-1}$. Furthermore, the positive active material of Example 1 had a Raman Spectroscopy intensity ratio I(587)/I(567) of about 1.066, and that of Comparative Example 1 had a Raman Spectroscopy intensity ratio I(587)/I(567) of about 1.02, as shown in FIG. 4. These results may be caused by the fact that carbon dioxide of $Li_2CO_3$ is not completely decomposed, and a $Li_2CO_3$ type of byproduct is produced through a reaction of lithium compound included in the mixture and the carbon dioxide.

Battery Cell Characteristics

The battery cell characteristics of the half-cells prepared according to Example 2 and Comparative Example 2 are shown in the following Table 1.

TABLE 1

|  | Charge Capacity at 0.1 C (mAh/g) | Discharge Capacity at 0.1 C (mAh/g) | Charge and Discharge efficiency (%) | Discharge Capacity at 0.2 C (mAh/g) | Discharge Capacity at 1 C (mAh/g) | Rate-Capability 1 C/0.1 C (%) |
|---|---|---|---|---|---|---|
| Example 2 | 197.0 | 178.9 | 90.8 | 173.9 | 157.9 | 88.3 |
| Comparative Example 2 | 194.7 | 172.8 | 88.7 | 166.9 | 146.4 | 84.7 |

As shown in Table 1, it is known that the charge and discharge efficiency and rate-capability of Example 2 were more excellent compared with Comparative Example 2.

While this disclosure has been described in connection with what is presently considered to be practical exemplary embodiments, it is to be understood that this disclosure is not limited to the disclosed embodiments, but, on the contrary, is intended to cover various modifications and equivalent arrangements included within the spirit and scope of the appended claims. Therefore, the above-mentioned embodiments are exemplary but do not limit in any sense.

What is claimed is:

1. A method for preparing a positive active material for a rechargeable lithium battery, comprising:
   a) providing a furnace and a crucible that is disposed within in the furnace;
   b) putting a mixture of a composite metal precursor and a lithium compound into the crucible;
   c) after putting the mixture into the crucible, forming a groove having predetermined gap and depth in the mixture disposed within the crucible; and
   d) preparing a positive active material for a rechargeable lithium battery by firing the mixture in the crucible,
   wherein in the process b), the mixture disposed within the crucible is positioned so that a minimum distance from a predetermined position inside the mixture to an exterior of the mixture in the crucible is about 5 cm or less.

2. The method of claim 1, wherein the mixture has a height measured from a bottom of the crucible of about 5 cm or less.

3. The method of claim 1, wherein the mixture has a height measured from a bottom of the crucible of about 3 cm or less.

4. The method of claim 1, wherein the groove having the predetermined gap and depth are formed in the mixture disposed within the crucible so that the minimum distance from the predetermined position inside the mixture to the exterior of the mixture is within about 5 cm or less, or
a minimum distance from the predetermined position inside the mixture to the groove is within about 5 cm or less.

5. The method of claim 1, wherein the positive active material comprises a lithium metal oxide represented by the following chemical formula:

$$Li_aMeO_2,$$

wherein Me is $Ni_xCo_yMn_zM'_k$, 0.45≤x≤0.65, 0.15≤y≤0.25, 0.15≤z≤0.35, 0.9≤a≤1.2, 0≤k≤0.1, x+y+z+k=1, and M' is Al, Mg, Ti, Zr, or a combination thereof.

6. The method of claim 5, wherein, in Chemical Formula 1, 0.55≤x≤0.65, 0.15≤y≤0.25, 0.15≤z≤0.25, 0≤k≤0.1, and x+y+z+k=1.

7. The method of claim 6, wherein y and z are the same.

8. The method of claim 1, wherein the composite metal precursor and the lithium compound of the process b) are mixed so that lithium of the lithium compound to the metal of the composite metal precursor have a mole ratio of about 0.9 to about 1.2.

9. The method of claim 8, wherein the mole ratio of lithium of the lithium compound to the metal of the composite metal precursor is about 0.97 to about 1.05.

10. The method of claim 1, wherein a firing temperature of the process d) ranges from about 800° C. or more to less than about 900° C.

11. The method of claim 10, wherein the firing temperature of the process d) ranges from about 850° C. to about 890° C.

12. The method of claim 1, wherein the lithium compound comprises lithium carbonate, lithium nitrate, lithium acetate, lithium hydroxide, lithium hydrate hydroxide, lithium oxide, or a combination thereof.

13. The method of claim 1, wherein, in the process d), air positioned on the upper side of the furnace satisfies the following equation:

$$x=\{\text{air influx per unit hour }(m^3/h)\}/\{\text{interior volume of a furnace }(m^3)\}$$

wherein 1.0≤x≤100.0.

\* \* \* \* \*